United States Patent [19]

Liow

[11] Patent Number: 6,038,612
[45] Date of Patent: Mar. 14, 2000

[54] METHOD AND SYSTEM FOR FACILITATING IRDA SUPPORT AND INTEGRATED MULTIMEDIA CONTROL FOR A CD-ROM DRIVE

[75] Inventor: Yuen Khim Liow, Singapore, Singapore

[73] Assignee: Creative Technology Limited, Singapore, Singapore

[21] Appl. No.: 08/752,743

[22] Filed: Nov. 14, 1996

[30] Foreign Application Priority Data

Sep. 4, 1996 [SG] Singapore .......................... 9611083-8

[51] Int. Cl.[7] ................................................... G06F 13/00
[52] U.S. Cl. ............................... 710/1; 710/67; 709/105; 341/26; 341/27
[58] Field of Search ............................... 369/50; 395/154, 395/821; 710/1, 67; 709/105; 341/26, 27

[56] References Cited

U.S. PATENT DOCUMENTS

| | | | |
|---|---|---|---|
| 4,918,445 | 4/1990 | Bower | 341/26 |
| 5,257,254 | 10/1993 | Kutaragi | 369/50 |
| 5,428,730 | 6/1995 | Baker et al. | 395/154 |
| 5,442,789 | 8/1995 | Baker et al. | 709/105 |
| 5,732,256 | 3/1998 | Smith | 395/601 |
| 5,818,689 | 10/1998 | Johns et al. | 361/685 |
| 5,838,983 | 11/1998 | Atkinson | 713/324 |

OTHER PUBLICATIONS

Structured Computer Organization, third edition, by Andrew S. Tanenbaum, 1990.
Zenith Data Systems, Dateline: Las Vegas Nov. 13, 1995 PR News Wire.
Apple CD 150 Drive debuts, HFD–The Weekly Home Furnishings Newspaper, V66, n15, p. 200(2), Apr. 13, 1992.
A User's Guide To Multimedia CD–Rom Drives, Sep. 93 Grossman, Becky, Lockwood, CD–ROM Professional, V6, n5, p. 150 (3).
Computer Shopper Jan. 1996, V16 n1, p. 408(2) Title: Strong multimedia, less portability., author: Honan, Patrick.

*Primary Examiner*—Glenn A. Auve
*Assistant Examiner*—Frantz B. Jean
*Attorney, Agent, or Firm*—Lawrence Y. D. Ho; David D. Chung; Jacqueline C. T. Lui

[57] ABSTRACT

A method and system for expanding the features and functions of a CD-ROM drive by facilitating communication between the drive and a host computer. The communication allows a user to control the basic functions, such as volume control, fast forwarding, and playing, from the hard buttons and knobs from the front panel of the drive without incurring conflict with the host computer. It can also allow an IRDA module to be attached to the drive to transfer IRDA data via the IDE/ATAPI port. A parameter and control pages are stored in the firmware of the CD-ROM drive. The parameter page provides parameters to define the input devices, and the control pages update the changes in the status of the input devices. The host computer reads the control pages at a predetermined interval and issues appropriate command based on the changes in the status.

7 Claims, 6 Drawing Sheets

| Bit Byte | 7 | 6 | 5 | 4 | 3 | 2 | 1 | 0 |
|---|---|---|---|---|---|---|---|---|
| 0 | PS (optional) Default 0 | Reserved | Page Code (20h) | | | | | |
| 1 | Page Length (10h) | | | | | | | |
| 2 | Reserved | | | | 0 (MCI Revision Level) | | | |
| 3 | Reserved | | | | | Master/ CD-ROM Mode | Fuzzy Mode | Multimedia Mode |
| 4 | IrDA Protocol Revision | | | IrDA Support | Reserved | Reserved | Reserved | Remote Control Support |
| 5 | Reserved | | | Toshiba RC Protocol Support | Samsung RC Protocol Support | Sony RC Protocol Support | RECS-80 RC Protocol Support | RC-5 Protocol Support |
| 6 | Reserved | | | Toshiba RC Enabled | Samsung RC Enabled | Sony RC Enabled | RECS-80 RC Enabled | RC-5 RC Enabled |
| 7 | Reserved | | | | | | | |
| 8 | Reserved | | | | | | | |
| 9 | MCU Polling Factor | | | | | | | |
| 10 | Reserved | | | | | | | |
| : | : | | | | | | | |
| 17 | Reserved | | | | | | | |

Byte 0.7 : Parameters Savable (PS) bit, used only with Mode Sense command. Reserved with Mode Select command.
Byte 0.6 : Reserved
Byte 0.5-0: Creative Multimedia Capabilities and Status Page code
Byte 1 : Page length of Page Code 20h
Byte 2.7-4: Reserved
Byte 2.3-0: MCI revision level indicates the revision level of the CMC Page format to cater for future page format change. The first implementation is revision 0.
Byte 3.7-3: Reserved
Byte 3.2 : 1=Master Mode indicating MCU has control of the sound card output, 0=CD-ROM Mode indicating audio jack is in use.
Byte 3.1 : 1=drive operating in Fuzzy Mode; (set 1 to enable via Mode Select)
Byte 3.0 : 1=Multimedia Mode, 0=Standard Mode (set 1 to enable via Mode Select)
Byte 4.7-3: IrDA Protocol Revision,( valid only if IrDA is supported).
Byte 4.4 : IrDA support; 0= no IrDA capability
Byte 4.3-1:Reserved
Byte 4.0 : Remote control support; 0= no remote control capability
Byte 5.7-4: Reserved
Byte 5.3-0: 1=Indicates that the protocol is supported
Byte 6.7-4: Reserved
Byte 6.3-0: 1=Indicates that the protocol is enabled
Byte 7-8 : Reserved
Byte 9.7-4: Reserved
Byte 9.3-0: MCU polling frequency, determines timeout check by firmware
    MCU polling interval (Tpoll) is determine by polling factor X 20ms
    MCU polling timeout ~ 10 Tpoll
Byte 10-17: Reserved.

FIG. 2

| Bit<br>Byte | 7 | 6 | 5 | 4 | 3 | 2 | 1 | 0 |
|---|---|---|---|---|---|---|---|---|
| 0 | PS (optional) Default 0 | - | Page Code (0 h) | | | | | |
| 1 | Parameter Length (0 6h) | | | | | | | |
| 2 | 0 (for CD-ROM) | | Device ID | | | | | |
| 3 | Disc Type | | | | Drive Status | | | |
| 4 | RESERVE | | | | | | | |
| 5 | Volume Up | Volume Down | Skip Forward | Skip Backward | Fast Forward | Reverse | Play/ Pause/ Resume | Stop/ Load/ Eject |
| 6 | Not Defined | | | | | Master/ Slave Vol | Voice Read Track | Toggle Fuzzy Mode |
| 7 | Input Count | | | | | | | |

*Byte 0.7* : Parameters Savable (PS) bit, used only with Mode Sense command. Reserved with Mode Select command.
*Byte 0.6* : reserved
*Byte 0.5-0* : Creative Multimedia Control Page code
*Byte 1* : Parameter Length, the number of valid bytes following.
*Byte 2.7-6* : 0 for CD-ROM device
*Byte 2.5-0* : CD-ROM Device ID
*Byte 3.7-4* : Return the disc type if present.
*Byte 3.3-0* : Indicates the current status of the drive
*Byte 4* : Reserve
*Byte 5* : A value of 1 in bits 0-7 indicates the user input. The firmware will perform the appropriate software debouncing such that only 1 bit will be set at any time.
*Byte 6.2* : 1 = Master volume setting { audio output from sound card }
: 0 = Slave volume setting { audio output from CD-ROM }
*Byte 6.1* : 1 = Voice Read Track selected; 0 = Not selected
*Byte 6.0* : 1= Togggle Fuzzy Mode; 0 = No change
*Byte 7* : The number of times the particular button is depressed.

FIG. 5

| Bit Byte | 7 | 6 | 5 | 4 | 3 | 2 | 1 | 0 |
|---|---|---|---|---|---|---|---|---|
| 0 | PS (optional) Default 0 | - | Page Code (0h) ||||||
| 1 | Parameter Length (0 6h) ||||||||
| 2 | colspan="2" 1 (for Remote Control) || colspan="6" R C Device ID { same as that in Table 2, byte 5 } ||||||
| 3 | Disc Type |||| Drive Status ||||
| 4 | rmc command byte 0 ||||||||
| 5 | rmc command byte 1 ||||||||
| 6 | rmc command byte 2 ||||||||
| 7 | rmc command byte 3 ||||||||

Byte 0.7 : Parameters Savable (PS) bit, used only with Mode Sense command. Reserved with Mode Select command.

Byte 0.6 : reserved

Byte 0.5-0: Creative Multimedia Control Page code

Byte 1 : Parameter Length, the number of valid bytes following.

Byte 2.7-6: 1 for Remote Control device

Byte 2.5-0: Remote control device ID (RC-5 = 1h; RECS-80 = 2h; SONY = 4h ; Samsung = 8h; Toshiba = 10h)

Byte 3.7-4 : Return the disc type if present.

Byte 3.3-0 : Indicates the current status of the drive

Byte 4 : Reserve

Byte 5-7 : Remote control raw data. ( Byte 5 is the lsb. )

F I G. 6

METHOD AND SYSTEM FOR FACILITATING IRDA SUPPORT AND INTEGRATED MULTIMEDIA CONTROL FOR A CD-ROM DRIVE

FIELD OF THE INVENTION

This invention relates to the field of CD-ROM drives, and in particular to a method and system for facilitating total control of the CD-ROM drive from the front panel and for expanding the CD-ROM drive's functionalities to include support for IRDA data communication.

BACKGROUND OF THE INVENTION

CD-ROM drive is a standard peripheral device for current personal computer (PC) systems. The CD-ROM drive is most commonly interfaced with the host PC through a IDE/ATAPI interface cable with the standard protocol. The primary function of the CD-ROM drive is to read and play the content of a CD-ROM, CDDA audio, and other types of discs. The IDE/ATAPI protocol is defined only for this purpose, and hence it is limited to facilitating the read/write function of these standard storage devices. Other potential functions are not compatible with the IDE/ATAPI protocol as it is currently used. Hence the current CD-ROM drives are limited to this read/write function.

The CD-ROM drives utilizing the IDE/ATAPI bus can only respond to the system command from the host system and carry out the request. The undesirable consequence is that a user has no proper control over the functions such as volume, play, stop, etc., of the CD-ROM drive from an external source, particularly the outside panel of the drive. Although there are some control buttons and knobs on the front panel of the current CD-ROM drives, they are used to control the operation on the drive locally; the information from the buttons is not passed back to the host PC.

This lack of communication, can potentially lead to conflicts between the PC software and the panel control. Because the drive can be controlled by both the hardware buttons and knobs on the front panel as well as from the host PC through IDE/ATAPI commands, the drive sometimes runs into a situation where the user uses the two means of control at the same time. For instance, the user may use the software on host PC to start playing an audio disc yet at the same time, engage the stop/eject button on the panel to stop the disc from playing. In such a situation, the CD-ROM tray may be ejected but the host computer will be unaware of the current status of the CD-ROM drive. This problem arises because there is no communication between the host PC and the control buttons and knobs, and therefore, there is no unified control over the functions of the drive. The host PC has no information in respect to the status of the drive as related to these controls.

This failure in communication between the CD-ROM drive controls and the host computer prevents control devices from being effectively added to the outside panel of the CD-ROM drive. Indeed, the current drives typically do not come with any controls other than a simple eject button and/or volume control. Although other controls are currently provided for in a software format, there are advantages to having effective hard knob and button controls. For one, the software control often takes more steps for the user to execute than a simple external button or a knob. This is particular true if the control software is not already running. Hence, at times, it would take the user 5 to 10 steps to execute a function which may only take a push or a turn if a hard button or knob were provided on the external panel.

But in addition to this shortcoming of the existing systems, the failure in communication also hinders, if not prevents, one from expanding the functions of the CD-ROM drive for uses other than simply reading/writing information from and onto an optical disc. For instance, one cannot attach an IRDA device to a CD-ROM drive to transfer IRDA data from an external source to the host computer. Although currently an IRDA device can be connected to a serial port which is usually located in the back of a computer, data transmission through the IDE/ATAPI port offers an advantage over serial ports in that the IDE/ATAPI port supports a high-speed transfer rate which is a limited precious resource. IRDA devices which are connected via the serial port are typically limited to 115.2 Kbps in the current systems. Protocol for higher baud rates such as 1 Mbps and 4 Mbps have been defined, but they generally require special interfaces which will be expensive to build.

In light of the advantages offered by the hard controls, and the usefulness of having IRDA support for a CD-ROM drive, it would be highly desirable to facilitate an effective communication between the drive and the host PC to be able to utilize hard knobs and buttons for the drive control, and use the IDE/ATAPI bus to pass other types of information, such as IRDA data, which other interface ports may not be able to provide a suitable throughput.

OBJECT OF THE INVENTION

It is therefore an object of the present invention to provide a method and apparatus for facilitating integrated multimedia control for a CD-ROM drive such that a user can easily and completely control the functions of the drive from an outside panel without confronting the possibility of conflicts with the software controls of the host PC.

It is further an object of this invention to provide a method and apparatus for facilitating IRDA support for a CD-ROM drive such that a user can utilize the fast IDE/ATAPI bus to transfer IRDA data from a external source to the host PC.

SUMMARY OF THE INVENTION

In the present invention, a firmware in a micro-controller unit (MCU) stores special parameter pages which are defined for the purpose of setting the drive to different modes of operation. The firmware also stores special control pages for updating the status of the controls of the CD-ROM drive. In the special mode, various features can be supported on the CD-ROM drive by specifying the necessary parameters in the parameter page. For instance, by specifying the parameters for multimedia input devices for controls such as volume, stopping, skipping, forwarding, reversing, ejecting, etc., all of the customary functions of a CD-ROM drive can be controlled by hard buttons and knobs on the front panel, rather than from a program in the host computer. If a remote input device is installed, the parameter page can specify parameters for facilitating remote control function. Furthermore, the page can also specify parameters for functions unrelated to controlling the CD-ROM drive, such as IRDA data communication so that data can be transferred from an external source to the host computer via IR pulses. If these or other parameters are not already defined or selected as default settings, other features can be further defined and/or selected from this page via the command MODE SELECT.

The host PC uses a program to communicate with a multimedia CD-ROM drive with the input devices. When the program is prompted to begin, whether by a user or by the drive itself, it reads the parameter page determine whether a certain feature is supported by the CD-ROM drive. If no such parameters are provided for in the parameter page, then the program is terminated. But if supported, an initialization process is ensued where changes can be made to the default settings if such changes are desired. Once the initialization process if finished, the program is put to sleep.

In order to continuously monitor the status of the various devices on the CD-ROM drive, a program is run at predetermined intervals. This can be accomplished, for instance, by using the timer interrupt of the host computer. In this program, the PC checks to see if a new disc has been inserted. If no disc has been inserted, the PC reads the control page. But if it finds a disc, then it checks the disc type. The PC then determines whether the disc type is supported, and plays the disc if the disc is of the type supported by the system. If the disc is not of the type supported by the system, the PC reads the control page.

The control page is continually updated in correspondence with the inputs from the various CD-ROM input devices. The updating is done by the firmware in the MCU which collects the status data from the various input devices such as the remote controller module and the IRDA module, and maps the information to the corresponding control pages. Each set of the input devices can have its own control page.

After reading the control page, the PC determines whether an action needs be taken based on the status of the devices and modules in the CD-ROM drive. If for instance, the status of the volume control button has changed to reflect a need for greater volume, the appropriate action is taken to increase the volume. If no change is status is detected which would warrant a corresponding action, then the program is put to sleep until the next interval cycle.

BRIEF DESCRIPTION OF THE DRAWINGS

FIG. 2 illustrates multimedia capabilities and status page which defines the parameters to enable various added functions to a CD-ROM drive.

FIG. 5 illustrates the control page for the multimedia input devices.

FIG. 6 illustrates the control page for a remote control input device.

DETAILED DESCRIPTION OF THE INVENTION

A typical PC system with a CD-ROM drive has a device driver to handle communication between the CD-ROM drive and the host computer. In general, the device driver carries out the following functions:

Detect the CD-ROM drive
Initialize the CD-ROM drive
Identify the capability of the CD-ROM drive
Receive requests and commands via a software, relay the requests and commands to the CD-ROM drive in IDE/ATAPI format and relay information regarding the data and status of the drive to the software.

Figure 1:
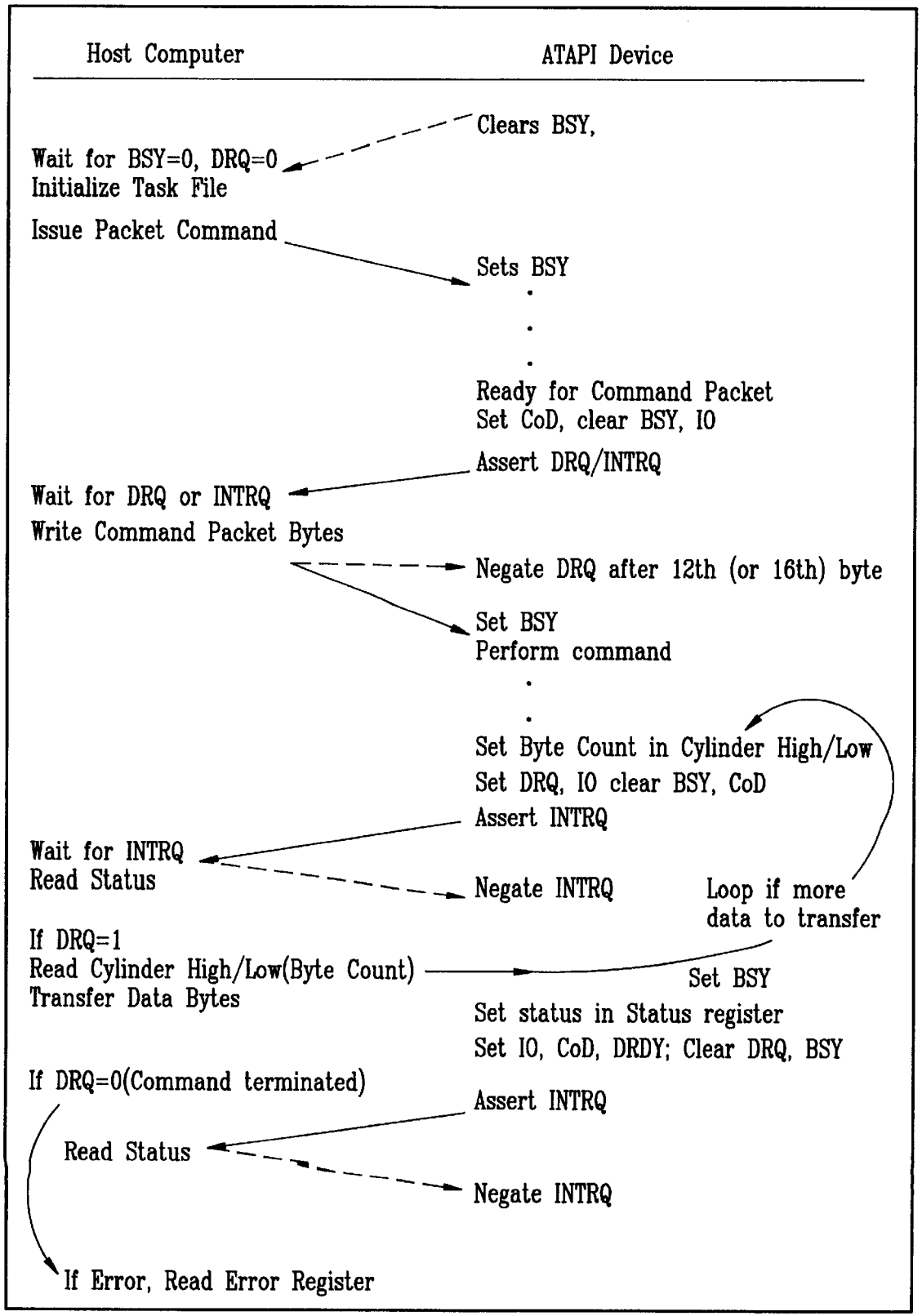
FIG. 1 (prior art) illustrates the ATAPI protocol commonly used to facilitate communication between a device driver and a CD-ROM drive.

A typical flow of the events specified by the ATAPI protocol is shown in FIG. 1. The solid lines indicate control flow and dotted lines are actions taken but without direct control flow change occurring. The ATAPI protocol is a well-established standard in the industry and therefore is well known to those skilled in the art. Hence, the protocol will not be extensively discussed except to the extent necessary to fully describe the present invention.

An ATAPI command MODE SENSE is used to read the different pages of parameters of the CD-ROM drive. Another ATAPI command, MODE SELECT is used to set the parameters of the drive. In the current PC systems, the pages do not specify parameters for modes of operation beyond the read/write commands and other typical commands generally associated running optical discs in the drive. Hence, no other features are available for the CD-ROM drive which can directly communicate with the host computer. So for instance, although the current CD-ROM drive systems typically have an eject button, the button operates independently from the host computer, and may lead to conflicts in the system, One of the objectives of the present invention is to avoid this type of conflict by facilitating communication between the host computer and the controls. It shall be seen that in addition to avoiding these conflicts, having such communication allows one to expand the traditional functions of a CD-ROM drive to take advantage of the fast IDE/ATAPI bus.

Figure 7:
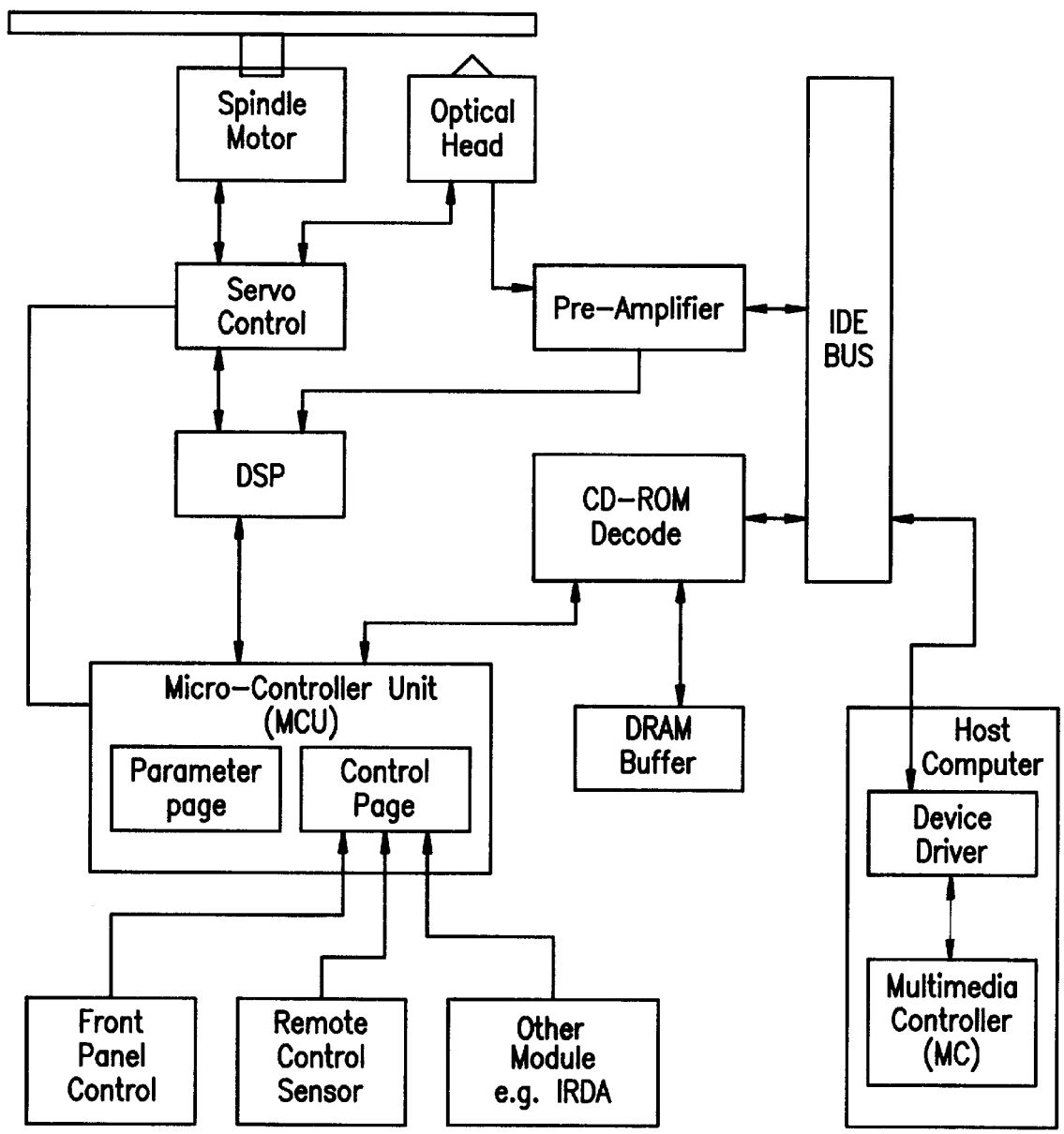
FIG. 7 is a block diagram illustrating the configuration of the CD-ROM drive and a host computer with the multimedia control devices, remote control device, and an IRDA module in place.

In the present invention, a firmware in a micro-controller unit (MCU) stores special parameter pages which are defined for the purpose of setting the drive to different modes of operation. The firmware also stores special control pages for updating the status of the controls of the CD-ROM drive. FIG. 7 generally illustrates this set up. FIG. 2 illustrates a sample parameter page called the Multimedia Capabilities and Status page for a CD-ROM drive having multimedia control capabilities. This page, called Page 20 h for short, is used for MCU handshaking to enable the Multimedia Mode of the drive. Using the command MODE SENSE, the host computer can check the special capabilities of the multimedia drive by reading page 20 h from the MCU. The command MODE SELECT can be used to set the parameters of the drive by writing to the parameter page.

In the Multimedia Mode, various features can be supported on the CD-ROM drive by specifying the necessary parameters in the parameter page. For instance, by specifying the parameters for multimedia input devices for controls such as volume, stopping, skipping, forwarding, reversing, ejecting, etc., all of the customary functions of a CD-ROM drive can be controlled by hard buttons and knobs on the front panel, rather than from a program in the host computer. If a remote input device is installed, the parameter page can specify parameters for facilitating remote control function. Furthermore, the page can also specify parameters for functions unrelated to controlling the CD-ROM drive, such as IRDA data communication so that data can be transferred from an external source to the host computer via IR pulses. If these or other parameters are not already defined or selected as default settings, other features can be further defined and/or selected from this page via the command MODE SELECT. For example, here one can select a feature termed Fuzzy Mode or Master/CD-ROM Mode (this is just the names for a sample feature placed here for illustration only).

Figure 3:
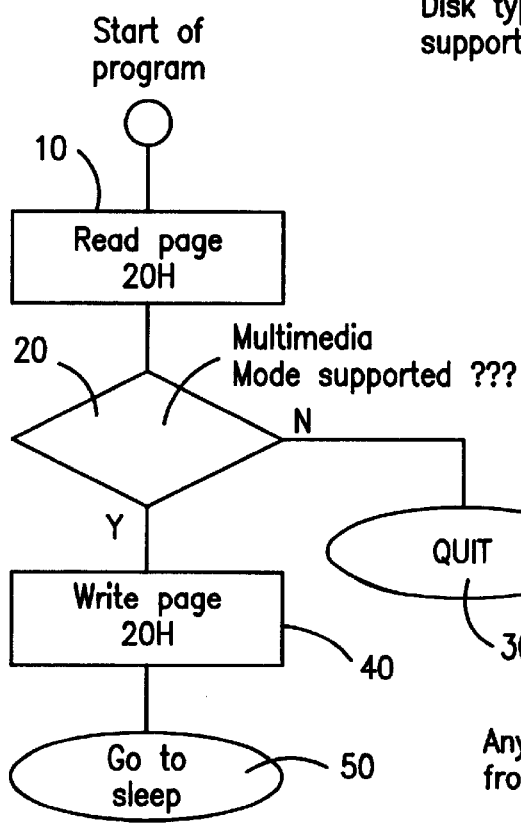
FIG. 3 illustrates a flow diagram of an algorithm to determine the capabilities of a CD-ROM drive.
Figure 4:
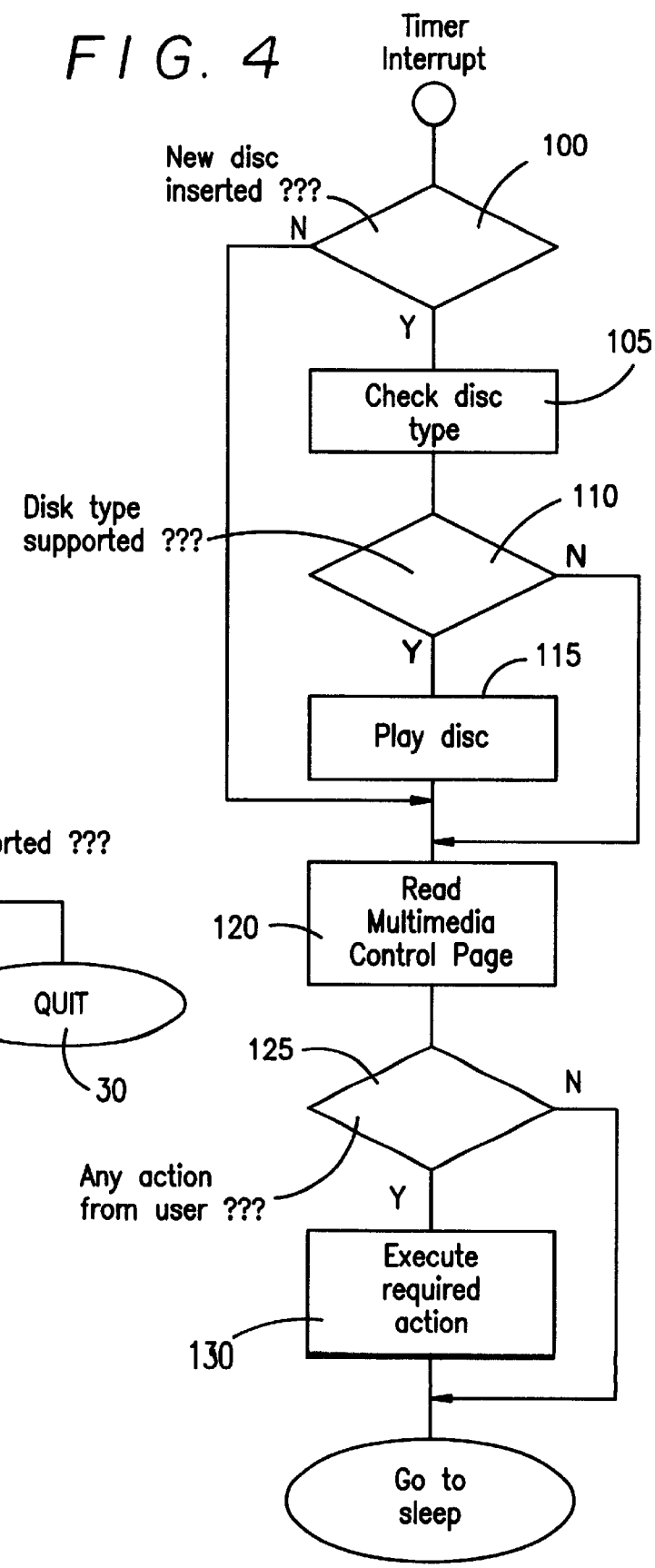
FIG. 4 illustrates a flow diagram of an algorithm to determine the status of the various features of the CD-ROM drive.

FIG. 3 and FIG. 4 illustrate the flow diagrams for the program that the host PC uses to communicate with a multimedia CD-ROM drive with the input devices. Referring first to FIG. 3, when the program is prompted to begin, whether by a user or by the drive itself, it reads page 20 H in step 10 to determine whether a certain feature, in this case the Multimedia Mode, is supported by the CD-ROM drive. If no such parameters are provided for in page 20H, as determined in step 20, then the program is terminated in step 30. But if supported, an initialization process is ensued in step 40 where changes can be made to the default settings if such changes are desired. Once the initialization process if finished in step 40, the program is put to sleep in step 50.

In order to continuously monitor the status of the various devices on the CD-ROM drive, a program is run at predetermined intervals. This can be accomplished, for instance, by using the timer interrupt of the host computer. While various intervals are, of course, possible, an interval of 250 ms was used for the present invention.

FIG. 4 illustrates the flow diagram for monitoring the status of CD-ROM drive and the input devices using the timer interrupt. In step 100, the PC checks to see if a new disc has been inserted. If no disc has been inserted, it jumps to step 120. But if it finds a disc, then it checks the disc type in step 105. The PC then determines whether the disc type is supported in step 110, and plays the disc in step 115 if the disc is of the type supported by the system. The disc which is supported can be of various types such as CDDA audio, MPEG, Video CD, and data disc with wave files. If the disc is not of the type supported by the system, the PC jumps to step 120.

In step 120, the PC reads the control page which is continually updated in correspondence with the inputs from the various CD-ROM input devices. The updating is done by the firmware in the MCU which collects the status data from the various input devices such as the remote controller module and the IRDA module, and maps the information to the corresponding control pages. Each set of the input devices can have its own control page. FIG. 5 and FIG. 6 illustrate a sample control page for the multimedia input devices and the remote control device. Other devices such as the IRDA module can have similar control pages.

In step 125, the PC determines whether an action needs be taken based on the status of the devices and modules in the CD-ROM drive. If for instance, the status of the volume control button has changed to reflect a need for greater volume, the appropriate action is taken in step 130 to increase the volume. If no change is status is detected in step 125 which would warrant a corresponding action, then the program is put to sleep until the next interval cycle.

While the present invention has been described in detail herein in accord with certain preferred embodiments thereof, many modifications and changes therein may be effected by those skilled in the art. Accordingly, it is intended by the appended claims to cover all such modifications and changes as falling within the true spirit and scope of the present invention.

We claim:

1. A method for facilitating integrated multimedia control for a CD-ROM drive having a hardware volume control comprising:

reading a parameter page to determine whether said hardware volume control exists;

updating a control page in correspondence with a change in status of said hardware volume control;

reading said control page at a predetermined interval to determine the status of said hardware volume control; and issuing a command to carry out an appropriate action based on said status of said hardware volume control.

2. A method for facilitating integrated multimedia control for a CD-ROM drive having a hardware volume control as recited in claim 1 further comprising writing to said parameter page.

3. A method for facilitating integrated multimedia control for a CD-ROM drive having a hardware play button comprising:

reading a parameter page to determine whether said hardware play button exists;

updating a control page in correspondence with a change in status of said hardware play button;

reading said control page at a predetermined interval to determine the status of said hardware play button; and issuing a command to carry out an appropriate action based on said status of said hardware play button.

4. A method for facilitating integrated multimedia control for a CD-ROM drive having a hardware play button as recited in claim 3 further comprising writing to said parameter page.

5. A method for facilitating integrated multimedia control for a CD-ROM drive having a hardware fast skipping button comprising:

reading a parameter page to determine whether said hardware fast skipping button exists;

updating a control page in correspondence with a change in status of said hardware fast skipping button;

reading said control page at a predetermined interval to determine the status of said hardware fast skipping button; and issuing a command to carry out an appropriate action based on said status of said hardware fast skipping button.

6. A method for facilitating integrated multimedia control for a CD-ROM drive having a hardware fast forward/backward button comprising:

reading a parameter page to determine whether said hardware fast forward/backward button exists;

updating a control page in correspondence with a change in status of said hardware fast forward/backward button device;

reading said control page at a predetermined interval to determine the status of said hardware fast forward/backward button; and issuing a command to carry out an appropriate action based on said status of said hardware fast forward/backward button.

7. A method for facilitating integrated multimedia control for a CD-ROM drive having a hardware special mode button comprising:

reading a parameter page to determine whether said hardware special mode button exists;

updating a control page in correspondence with a change in status of said hardware special mode button;

reading said control page at a predetermined interval to determine the status of said hardware special mode button; and issuing a command to carry out an appropriate action based on said status of said hardware special mode button.

* * * * *